US008461540B2

(12) United States Patent
Nakashima et al.

(10) Patent No.: US 8,461,540 B2
(45) Date of Patent: Jun. 11, 2013

(54) INSIDE-TUBE-WALL RADIOACTIVE CONTAMINATION MONITOR, AND MONITORING DEVICE AND METHOD USING THE SAME

(75) Inventors: Yasunori Nakashima, Yokohama (JP); Tetsuo Goto, Yokohama (JP); Kenzo Ogawa, Kanagawa (JP)

(73) Assignees: Kabushiki Kaisha Toshiba, Tokyo (JP); Toshiba Power Systems Radiation Techno-Service Co., Ltd., Yokohama-shi (JP); Toshiba Plant Systems & Services Corporation, Yokohama-shi (JP)

( * ) Notice: Subject to any disclaimer, the term of this patent is extended or adjusted under 35 U.S.C. 154(b) by 13 days.

(21) Appl. No.: 13/127,992

(22) PCT Filed: Nov. 10, 2009

(86) PCT No.: PCT/JP2009/005983
§ 371 (c)(1),
(2), (4) Date: Jul. 19, 2011

(87) PCT Pub. No.: WO2010/052938
PCT Pub. Date: May 14, 2010

(65) Prior Publication Data
US 2011/0284752 A1 Nov. 24, 2011

(30) Foreign Application Priority Data
Nov. 10, 2008 (JP) ................. 2008-287986

(51) Int. Cl.
G01T 1/20 (2006.01)
(52) U.S. Cl.
USPC ...................... 250/368; 250/361 R
(58) Field of Classification Search
USPC ....................................... 250/368
See application file for complete search history.

(56) References Cited

U.S. PATENT DOCUMENTS

| 5,204,622 | A | * | 4/1993 | McCaslin et al. | ............. 324/220 |
| 5,881,116 | A | * | 3/1999 | Hatakeyama et al. | ........ 376/245 |
| 6,792,069 | B2 | * | 9/2004 | Hirabayashi et al. | ........... 378/58 |
| 8,044,356 | B2 | * | 10/2011 | Sumita et al. | ................. 250/368 |
| 2010/0282975 | A1 | | 11/2010 | Sumita et al. | |

FOREIGN PATENT DOCUMENTS

| JP | 61 123613 | 8/1986 |
| JP | 2008 145427 | 6/2008 |

OTHER PUBLICATIONS

International Preliminary Report on Patentability issued Sep. 15, 2011 in Application No. PCT/JP2009/005983.
Sumita, A. et al., "Development of Surface Contamination Monitor for Inner Face of Thin Tubes (1)", F49, Atomic Energy Society of Japan, p. 290, (Mar. 6, 2007) (with English translation).
Goto, T. et al., "Development of Surface Contamination Monitor for Inner Face of Thin Tubes (2)", F50, Atomic Energy Society of Japan, p. 291, (Mar. 6, 2007) (with English translation).
International Search Report Issued Dec. 8, 2009 in PCT/JP09/005983 filed Nov. 10, 2009.

* cited by examiner

Primary Examiner — Marcus Taningco
(74) Attorney, Agent, or Firm — Oblon, Spivak, McClelland, Maier & Neustadt, L.L.P.

(57) ABSTRACT

Even when a radiation detector contacts a pipe arrangement or another member that is an object to be monitored, the damage of the detector is prevented without impairing the detection performance. An inside-tube-wall radioactive contamination monitor comprises: a rod-like light guide bar having a polygonal cross-section; a plurality of scintillators secured to the outer circumferential surface of the light guide bar; a net-like protective tube worn so as to cover the outer circumference of the scintillators with a space between the surfaces of the scintillators and the tube; and a guide portion attached to an end of the net-like protective tube, supporting an end of the light guide bar, and having a shape the diameter of which decreases as approaching the end. The monitor includes: a photoelectric conversion unit coupled to the base end of the net-like protective tube and incorporating a photoelectric conversion element; and a signal processing unit connected to the photoelectric conversion unit.

13 Claims, 6 Drawing Sheets

INSIDE-TUBE-WALL RADIOACTIVE CONTAMINATION MONITOR, AND MONITORING DEVICE AND METHOD USING THE SAME

TECHNICAL FIELD

The present invention relates to monitoring of radioactive contamination, and in particular, relates to a monitor to monitor for radioactive contamination of an inside-wall surface of a small caliber tube, a monitoring device, and a monitoring method.

BACKGROUND ART

A heat exchanger such as a condenser and feedwater heater for a main turbine of a nuclear power plant has many heat exchanger tubes, which are small caliber tubes, installed therein. These heat exchanger tubes are replaced and disposed of when the end of their life comes. However, according to a disposal method of shredding all applicable heat exchanger tubes and filling a drum with shredded heat exchanger tubes, a large number of drums will arise and the disposal cost needed to store and bury these drums will be vast. Thus, it is necessary to reduce the quantity of drums to be disposed of by decontaminating heat exchanger tubes.

For this purpose, the reduction in quantity of drums to be disposed of has been achieved by the method described below. That is, after a heat exchanger tube being cut to fixed lengths, cut heat exchanger tubes are half-cut in the longitudinal direction and radioactive substances adhering to inner and outer surfaces are decontaminated by blasting or the like. Next, a decontamination result is checked by a survey meter and heat exchanger tubes whose radioactive contamination is not confirmed are not disposed of after being packed in a drum and only heat exchanger tubes whose radioactive contamination is confirmed are disposed of by being packed in a drum.

However, according to the method of half-cutting heat exchanger tubes in the longitudinal direction and half-cut heat exchanger tubes are decontaminated and then making measurements by a survey meter, it is necessary to half-cut a vast amount of heat exchanger tubes, posing problems that the number of processes increases, time and labor are needed, and further energy such as power is needed and installation costs of facilities increase.

Patent Document 1 discloses a radiation measuring device allowing radiation measurements of inside-tube-wall surface to be made easily without half-cutting a heat exchanger tube. That is, a radiation detector configured by mounting a scintillator unit on a rod-like transparent light guide unit extended from a photoelectric conversion unit and attaching a light-shielding portion that allows radiation to pass through, but blocks light to an outer surface thereof is disclosed.

The radiation detector disclosed by Patent Literature 1 enables radiation measurements of inner-wall surface of a long tube so that monitoring of radioactive contamination of the inner-wall of a tube can be performed efficiently. However, when such a long radiation detector is inserted into a tube, a radioactive substance may adhere to the detector through contact between the tube and the detector, which makes it necessary to decontaminate the detector each time monitoring is performed or pay close attention so that the detector is not damaged by contact with the tube, other tools, or other members. Further, even if close attention is paid, the detector may be damaged by contact with the tube or other members.

CITATION LIST

Patent Literature

PLT 1: Japanese Patent Application Laid-Open No. 2008-145427

SUMMARY OF THE INVENTION

Technical Problem

An object of the present application is to provide an inside-tube-wall radioactive contamination monitor, a monitoring device, or a monitoring method capable of preventing damage of a detector without loss of monitoring performance even if the radiation detector and a tube to be monitored or another member come into contact.

Solution to Problem

An inside-tube-wall radioactive contamination monitor according to an embodiment of the present application includes a rod-like light guide bar whose section is polygonal, a plurality of scintillators mounted on an outer circumference of the rod-like light guide bar, a net-like protective tube attached to cover an outer circumference of the plurality of scintillators with a space to a surface of these scintillators, and a guide portion in a shape in which a diameter decreases with a decreasing distance to a tip of the guide portion, the guide portion being attached to a tip portion of the net-like protective tube and supporting the tip portion of the rod-like light guide bar. An inside-tube-wall radioactive contamination monitor according to the present embodiment also includes a photoelectric conversion unit coupled to a base end of the net-like protective tube and containing a photoelectric conversion element and a signal processing unit connected to the photoelectric conversion unit.

In the inside-tube-wall radioactive contamination monitor according to another embodiment of the present application, a light shielding film that allows radiation to pass through, but blocks light is arranged on the inner surface of the net-like protective tube.

In another embodiment of the present application, the net-like protective tube is formed of stainless steel.

In further embodiment of the present application, a plurality of radiation transmission holes in a parallel hexagonal shape in which one pair of opposite sides whose length is longer than other sides is formed reticulately in the net-like protective tube. The radiation transmission holes in the parallel hexagonal shape are arranged in such a way that sides whose length is longer than the other sides are parallel to an axis in a longitudinal direction of the net-like protective tube.

In still another embodiment of the present application, the net-like protective tube has an opening ratio of 85%.

In still another embodiment of the present application, the net-like protective tube is detachably mounted on a cabinet of the photoelectric conversion unit.

In still another embodiment of the present application, the photoelectric conversion element is fixed by molding resin injected into the cabinet of the photoelectric conversion unit and cured.

An inside-tube-wall radioactive contamination monitoring device according to an embodiment of the present application monitors for radiation of inner-wall surface of a tube by using an inside-tube-wall radioactive contamination monitor according to one of the above embodiments. The inside-tube-wall radioactive contamination monitoring device includes a workbench and the inside-tube-wall radioactive contamination monitor fixed onto the workbench. The monitoring device also includes a first roller group comprising a plurality of rollers arranged on the workbench along an axis of a radiation detection unit constituting the inside-tube-wall radioactive contamination monitor in such a way that rotation axes thereof are parallel to each other to transport the tube to be monitored and a second roller group comprising a plurality of rollers arranged on the workbench between the first roller group and the radiation detection unit along the axis of the radiation detection unit in such a way that the rotation axes thereof are parallel to each other to transport the tube to be monitored. Further, monitoring device includes at least a pair of longitudinal position regulation guide rollers provided on the workbench between the first roller group and the second roller group to regulate a position in a longitudinal direction of the transported tube to be monitored and a plurality of lateral position regulation guide rollers arranged in the first roller group or the second roller group to regulate the position in a lateral direction of the transported tube to be monitored.

At least the one pair of longitudinal position regulation guide rollers and the plurality of lateral position regulation guide rollers in the inside-tube-wall radioactive contamination monitoring device according to another embodiment of the present application have an hourglass shape in which a center portion thereof is contracted. Moreover, the longitudinal position regulation guide rollers are installed upright on an installation member provided on the workbench and the installation member is provided with elastic members as if to sandwich the tube to be monitored while being transported between the pair of longitudinal position regulation guide rollers.

In the inside-tube-wall radioactive contamination monitoring device according to another embodiment of the present application, a stopper to stop movement of the transported tube to be monitored is provided on the workbench between the photoelectric conversion unit and the second roller group.

In the inside-tube-wall radioactive contamination monitoring device according to still another embodiment of the present application, when the radiation detection unit constituting the inside-tube-wall radioactive contamination monitor is calibrated, a radiation measurement calibration jig to place a radiation source above the radiation detection unit is installed on the workbench. The radiation measurement calibration jig has radiation transmission holes through which radiation from the radiation source passes formed in an upper surface thereof.

An inside-tube-wall radioactive contamination monitoring method according to an embodiment of the present application monitors for radioactive contamination of an intratubal surface by using an inside-tube-wall radioactive contamination monitoring device. According to this monitoring method, the tube to be monitored is placed on the first roller group, the tube to be monitored is moved on the first roller group while being placed on the first roller group, a positional shift in the lateral direction of the tube to be monitored is regulated by the plurality of lateral position regulation guide rollers, the tube to be monitored is moved forward between at least the one pair of longitudinal position regulation guide rollers against the elastic members, and the positional shift in the longitudinal direction of the tube to be monitored is regulated. Moreover, the tube to be monitored is moved forward so that the radiation detection unit is inserted into the tube to be monitored while being placed on the second roller group and the inner surface of the tube to be monitored is monitored for radioactive contamination.

In an inside-tube-wall radioactive contamination monitoring method according to another embodiment of the present application, the tube to be monitored whose monitoring of the radioactive contamination is completed is pulled out from the radiation detection unit and a position in an axial direction of the tube to be monitored is reversed. Then, the inner surface of the tube to be monitored whose position has been reversed is monitored for the radioactive contamination by the above method.

As is understood by those skilled in the art, the present application can be carried out by other embodiments and details of some of them can be modified in various obvious modes without deviating from the scope of the present application. Therefore, drawings and descriptions should be considered actually intended as illustrations rather than limitations.

Advantageous Effects of Invention

According to an embodiment of the present application, an inside-tube-wall radioactive contamination monitor, a monitoring device, and a monitoring method capable of preventing damage of a detector without loss of monitoring performance even if the radiation detector and a tube to be monitored or another member come into contact are provided.

Other advantages, modes, and features of the present application will be clear to those skilled in the art from the following describing a preferred embodiment of the present application as an illustration of the most preferred embodiment to carry out the present application.

DESCRIPTION OF EMBODIMENTS

Figure 1:
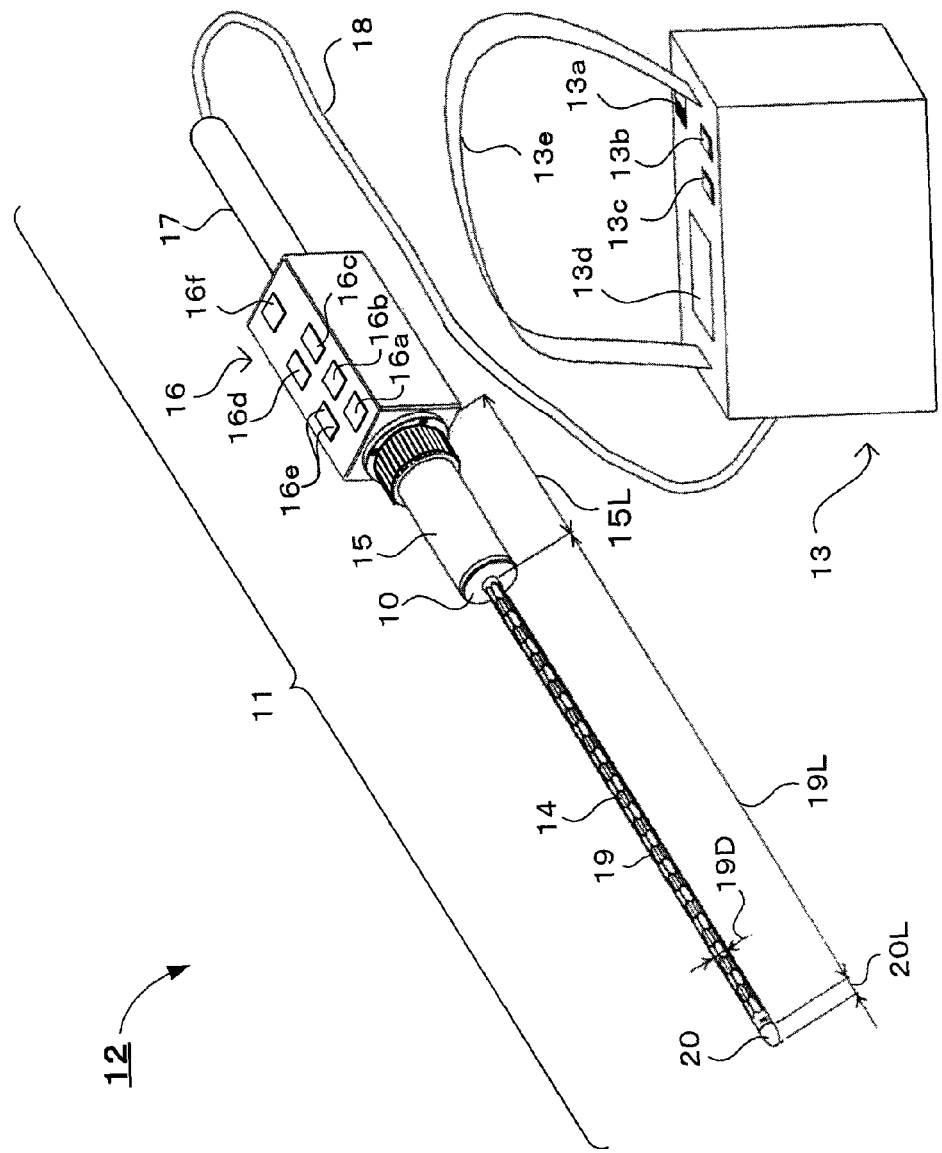
FIG. 1 is a diagram showing an appearance of an inside-tube-wall radioactive contamination monitor according to an embodiment of the present invention.

An embodiment according to the present invention will be described below with reference to drawings when appropriate. FIG. 1 shows an appearance of an inside-tube-wall radioactive contamination monitor 12 using an inside-tube-wall surface radiation detector 11 according to an embodiment of the present invention. The inside-tube-wall radioactive contamination monitor 12 comprises the inside-tube-wall surface radiation detector 11 and a measuring device 13. The inside-tube-wall surface radiation detector 11 comprises a radiation detection unit 14, a photoelectric conversion unit 15 that converts an optical signal detected by the radiation detection unit 14 and originating from radiation into an electric signal, a signal processing unit 16 that processes a signal from the photoelectric conversion unit 15, and a handle portion 17 mounted on the signal processing unit 16, and the handle portion 17 and the measuring device 13 are connected via a cable 18.

The radiation detection unit 14, whose details will be described later, has a net-like protective tube 19 attached to an outer circumference thereof and, for example, a bullet-like guide portion 20 is provided at the tip thereof. The shape of the guide portion 20 is not limited to a bullet shape and may be any shape like, for example, a cone shape whose diameter becomes smaller with a decreasing distance to the tip. The radiation detection unit 14 coaxially projects from the center of, for example, the cylindrical photoelectric conversion unit 15. The signal processing unit 16 comprises a high-voltage circuit, a coincidence circuit, a logic circuit and the like and an error display unit 16a, a reset switch 16b, a display unit 16c to indicate that contamination has been detected, a display unit 16d to indicate that no contamination has been detected, a measurement status display unit 16e and a measurement start switch 16f are provided on the upper surface thereof. The measurement status display unit 16e displays the status by color and, for example, green indicates that measurement is being made, yellow indicates that the device is under abnormal conditions, and red indicates high/low of background radiation. The measuring device 13 has a power switch 13a, a measurement start switch 13b, a reset switch 13c, an LCD display unit 13d, and a shoulder belt 13e to carry the device provided therein.

Principal dimensions of the radiation detection unit 14 and the photoelectric conversion unit 15 according to the present invention are, for example, as follows: A length 20L of the bullet-like guide portion 20 provided at the tip is 15 mm, an outside diameter 19D of the net-like protective tube 19 is 11 mm and a length 19L thereof is 420 mm, and a length 15L of the photoelectric conversion unit 15 is 130 mm. However, these dimensions do not limit the present invention.

By setting the outside diameter of the net-like protective tube 19 of the radiation detection unit 14 configured as described above to 11 mm, the detection unit 14 can be inserted into a small heat exchanger tube whose inside diameter is up to 13 mm. The longer the radiation detection unit 14, the longer the heat exchanger tube that can be monitored, but attenuation of an optical signal detected and originating from radiation becomes more conspicuous with an increasing length of the radiation detection unit 14 and thus, the above lengths are set. As a result, a heat exchanger tube to be monitored whose length is up to 600 mm can be monitored. That is, by inserting the radiation detection unit 14 from one end of the heat exchanger tube to be monitored, the inner surface of the heat exchanger tube up to about 400 mm from the one end is measured. Next, by inserting the radiation detection unit 14 from the other end of the heat exchanger tube, the inner surface of the heat exchanger tube up to about 400 mm from the other end is measured. A portion of about 100 mm in the center of the heat exchanger tube is measured duplicately and thus, there is no portion that is not measured and the entire inner surface of the heat exchanger tube can be measured.

By providing the net-like protective tube 19, which will be described in detail later, when the radiation detection unit 14 is inserted into a heat exchanger tube whose inside diameter is small, a plastic scintillator and the like inside the radiation detection unit 14 can be protected from damage caused by a collision or contact with the heat exchanger tube or other members.

For example, the bullet-like guide portion 20 is provided at the tip of the net-like protective tube 19, as described above, and a base end of the net-like protective tube 19 has a male screw formed therein and is firmly fixed to, for example, a circular metallic mounting plate 10. The mounting plate 10 is detachably screwed to the photoelectric conversion unit 15 to increase the stiffness of the thin and long radiation detection unit 14.

Figure 2:
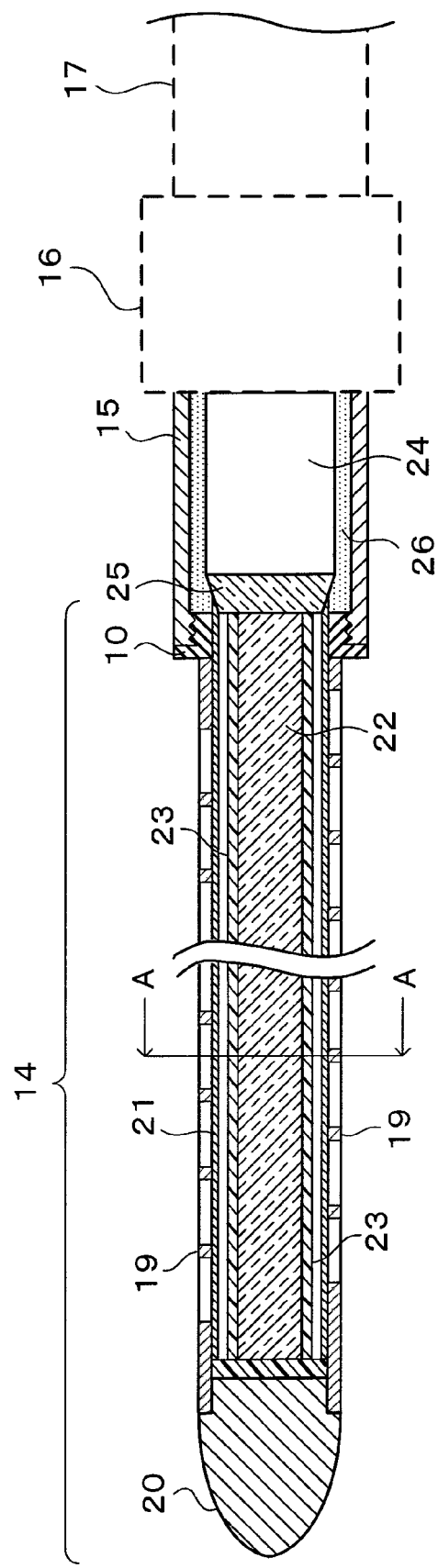
FIG. 2 is a diagram schematically showing a section in the longitudinal direction of a radiation detection unit of an inside-tube-wall surface radiation detector according to an embodiment of the present invention.
Figure 3:
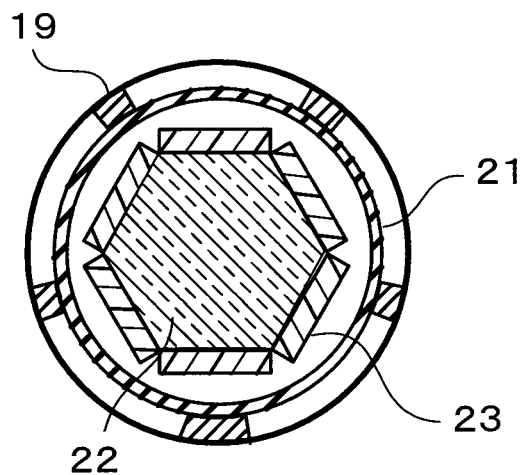
FIG. 3 is a diagram schematically showing a cross section of the radiation detection unit according to an embodiment of the present invention.

FIG. 2 is a diagram schematically showing a section in the longitudinal direction of the radiation detection unit 14 of the inside-tube-wall surface radiation detector 11 described above and FIG. 3 is an A-A line sectional view of the radiation detection unit 14 shown in FIG. 2. An overview of the radiation detection unit 14, the photoelectric conversion unit 15, and the signal processing unit 16 will be provided below, but the basic configuration thereof is the same as that disclosed by Patent Document 1.

A light shielding film 21 that allows radiation to pass through, but blocks light is arranged inside the net-like protective tube 19 to whose tip, for example, the bullet-like guide portion 20 is attached. A light guide bar 22 whose section is, for example, a hexagonal shape is arranged in the center of the radiation detection unit 14 and a scintillator 23 is mounted on each of six side surfaces around the light guide bar 22. The light guide bar 22 is, for example, wavelength shift bar that shifts the wavelength of light generated after radiation enters the scintillator 23 to a longer wavelength. The scintillator 23 is mounted with a clearance to the net-like protective tube 19 so as to make damage caused by a collision or contact with a heat exchanger tube or other members less likely when the heat exchanger tube is monitored. The tip portion of the light guide bar 22 is supported by the guide portion 20.

The photoelectric conversion unit 15 contains a photoelectric conversion element 24 and the photoelectric conversion element 24 and one end of the light guide bar 22 are connected via a transparent acryl light guide 25. The photoelectric conversion element 24 is firmly fixed by injecting molding resin 26 into a cabinet of the photoelectric conversion unit 15 and curing the molding resin 26. The mounting plate 10 to which the net-like protective tube 19 is fixed is tightly screwed into an opening provided in a case of the photoelectric conversion unit 15. By adopting such a configuration, the radiation detection unit 14 projecting long from the center of the photoelectric conversion unit 15 can be held without runout. The net-like protective tube 19 can easily be removed from the photoelectric conversion unit 15 for decontamination, replacement or the like.

Figure 4:
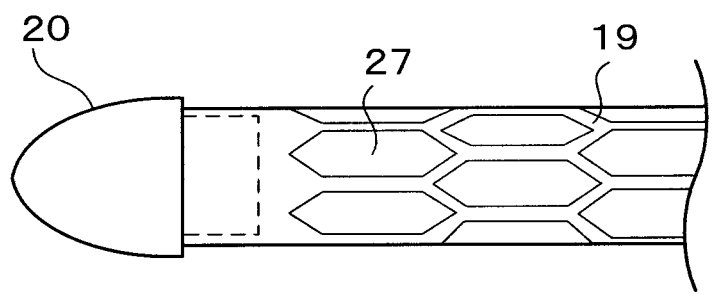
FIG. 4 is an enlarged view of a tip portion of a net-like protective tube covering an outer circumferential surface of the radiation detection unit according to an embodiment of the present invention.

FIG. 4 is an enlarged view of a tip portion of the net-like protective tube 19 covering an outer circumference of the radiation detection unit 14 shown in FIG. 2. The guide portion 20 in a bullet shape made of plastics or metal is attached to the tip of the net-like protective tube 19 and the radiation detection unit 14 is guided into a heat exchanger tube to be monitored by the guide portion 20.

The net-like protective tube 19 is made of, for example, stainless steel and has, as is evident by referring to FIG. 4, a plurality of radiation transmission holes 27 in a long parallel hexagonal shape in which one pair of opposite sides are longer than other sides is formed reticulately. These radiation transmission holes are arranged on the entire surface like a honeycomb in such a way that sides whose length is longer than other sides are parallel to the axis in the longitudinal direction of the net-like protective tube 19. Metal does not allow radiation to pass through and unless the total area of the plurality of radiation transmission holes 27 is large enough, the transmittance of radiation drops. However, if the opening area is too large, the function to mechanically protect the scintillator 23 of the net-like protective tube 19 will be lost.

In a radiation detection unit having each of the above dimensions, it turned out that the optimum balance between maintenance of mechanical strength of the net-like protective tube 19 and the transmittance of radiation can be obtained by setting the opening ratio of the net-like protective tube 19 to 85%. It also turned out that by adopting the hexagonal shape described above as the shape of the radiation transmission hole 27, the optimum relation between the above strength and the transmittance can be achieved.

Figure 5:
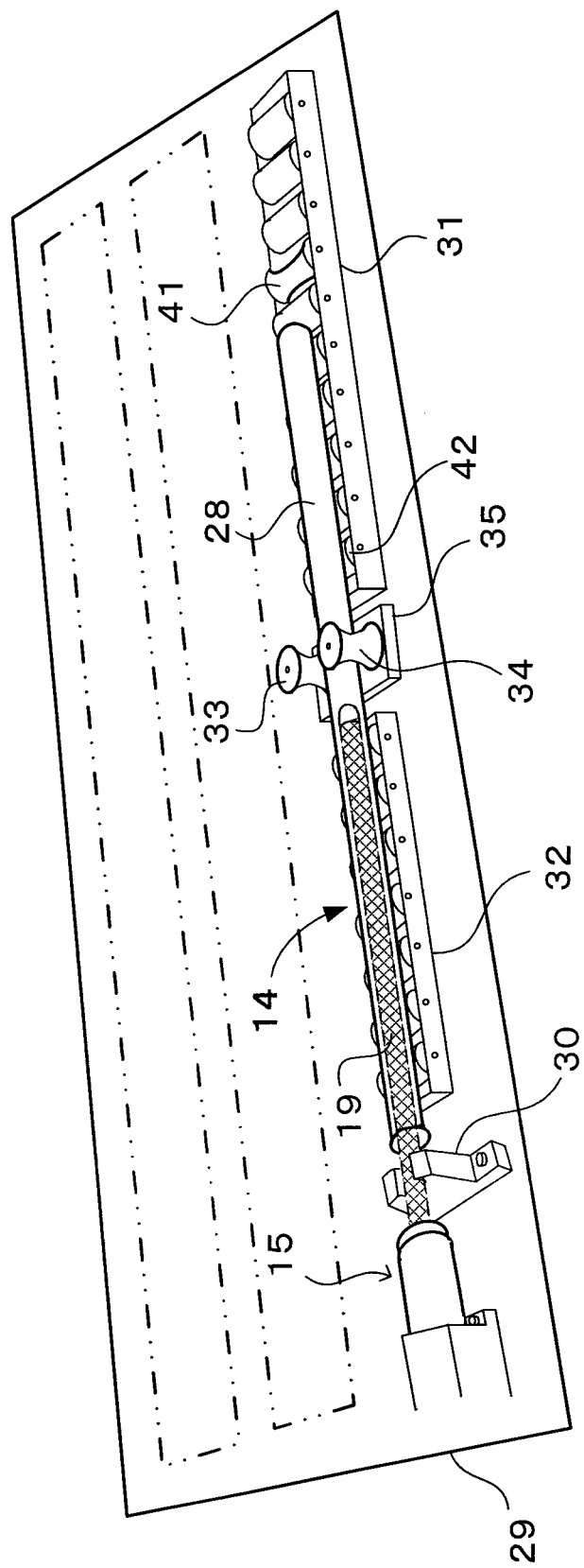
FIG. 5 is a diagram illustrating an outline and a monitoring state of the inside-tube-wall radioactive contamination monitoring device according to an embodiment of the present invention.
Figure 6:
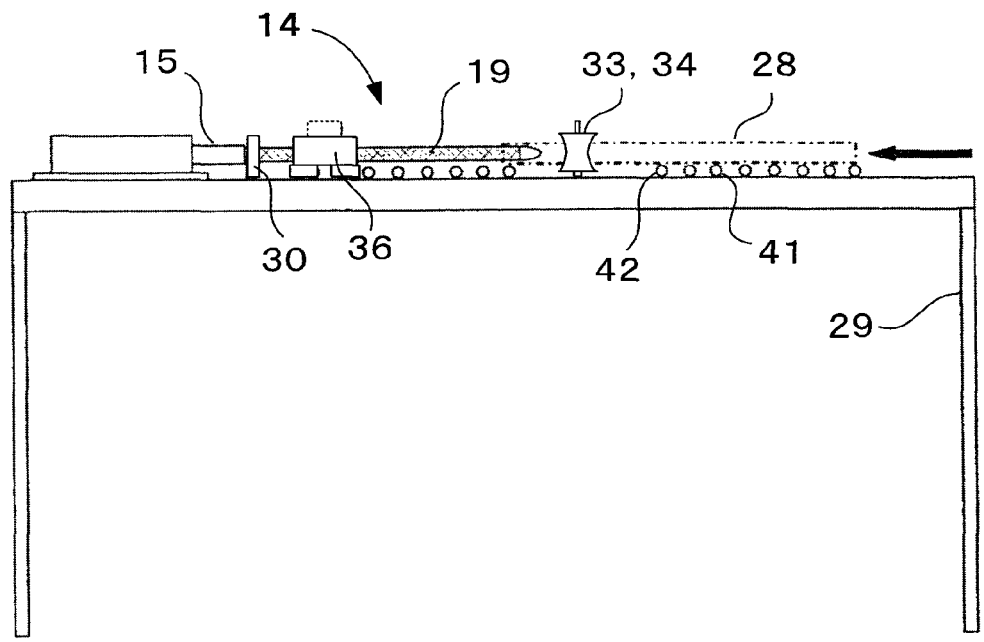
FIG. 6 is a diagram when the inside-tube-wall radioactive contamination monitoring device according to an embodiment of the present invention shown in FIG. 5 is viewed from a side.

Next, a monitoring device and a monitoring method that monitor for radioactive contamination of an inner surface of a heat exchanger tube 28 to be monitored by using the radiation detection unit 14 according to an embodiment of the present invention will be described with reference to FIGS. 5 to 8. FIG. 5 is a diagram showing an outline and a monitoring state of an inside-tube-wall radioactive contamination monitoring device according to an embodiment of the present invention and FIG. 6 is a diagram when the monitoring device shown in FIG. 5 is viewed from a side. In FIG. 5, at least a portion of the heat exchanger tube 28 where the radiation detection unit 14 is inserted into the heat exchanger tube 28 is illustrated transparently to enhance understanding.

As shown in FIGS. 5 and 6, the radiation detection unit 14 is arranged on a workbench 29. In this case, the radiation detection unit 14 is arranged in parallel with the workbench 29. An edge of the net-like protective tube 19 on the side of the photoelectric conversion unit 15 is placed on a stopper 30 on the workbench 29. The stopper 30 is fixed to the workbench 29 between the photoelectric conversion unit 15 and a second roller group 32 described later. The stopper 30 regulates the stop position when the heat exchanger tube 28 to be monitored moves from the right in FIG. 5.

As shown in FIG. 5, a first roller group 31 and the second roller group 32 that are arranged along the axis of the radiation detection unit 14 and each of which comprises a plurality of columnar rollers to move the heat exchanger tube 28 are provided on the workbench 29. Rotation axes of columnar rollers contained in each of the roller groups 31, 32 are arranged so as to be parallel to each other and perpendicular to the axis of the radiation detection unit 14. The first roller group 31 is arranged on the axis of the radiation detection unit 14 and the second roller group 32 is arranged between the radiation detection unit 14 and the first roller group 31 and, like the first roller group 31, on the axis of the radiation detection unit 14.

Lateral position regulation guide rollers 41, 42 in an hourglass shape in which the center portion is contracted are installed in two locations of an intermediate position of the first roller group 31 and a position closer to the radiation detection unit 14 respectively. As will be described later, the lateral position regulation guide rollers 41, 42 are provided so that when the heat exchanger tube 28 moves toward the radiation detection unit 14 after being placed on the first guide roller group 31, the heat exchanger tube 28 moves straight without being oscillating in the lateral direction. While the two lateral position regulation guide rollers 41, 42 are shown in FIG. 5, still more lateral position regulation guide rollers may be provided, for example, one lateral position regulation guide roller for every several columnar rollers.

A pair of longitudinal position regulation guide rollers 33, 34 is installed upright between the first roller group 31 and the second roller group 32 on the workbench 29. Like the lateral position regulation guide rollers 41, 42, the longitudinal position regulation guide rollers 33, 34 each have an hourglass shape in which the center portion is contracted and the position of the heat exchanger tube 28 in the longitudinal direction is regulated by the heat exchanger tube 28 being sandwiched between the guide rollers 33, 34. In this manner, the heat exchanger tube 28 is aligned by the lateral position regulation guide rollers 41, 42 and the longitudinal position regulation guide rollers 33, 34 so that the heat exchanger tube 28 is in a coaxial relationship with the radiation detection unit 14.

Figure 7:
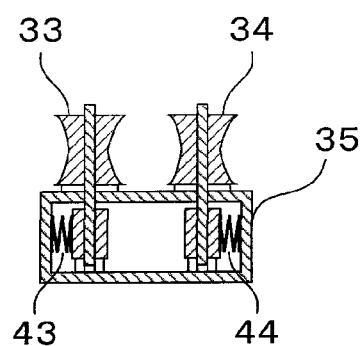
FIG. 7 is a diagram exemplifying an embodiment of a longitudinal position regulation guide roller and an elastic member of the inside-tube-wall radioactive contamination monitoring device according to an embodiment of the present invention shown in FIG. 5.

As an example, as shown in FIG. 7, elastic members 43, 44 like springs that press the pair of longitudinal position regulation guide rollers 33, 34 in mutually opposite direction with an equal force are provided inside an installation member 35 that installs the pair of longitudinal position regulation guide rollers 33, 34 upright. When the heat exchanger tube 28 is inserted between the pair of longitudinal position regulation guide rollers 33, 34, the heat exchanger tube 28 is inserted against a force by the elastic members caused by a pinching force of the elastic members 43, 44. The elastic forces applied to the pair of longitudinal position regulation guide rollers 33, 34 are equal and thus, the heat exchanger tube 28 is always held in the same position on the same axis as the radiation detection unit 14.

According to the monitoring device described above, even if a radiation detector and a tube to be monitored or other members come into contact, damage of the detector can be prevented without loss of measurement performance.

Next, the method of monitoring for radioactive contamination of the inner surface of the heat exchanger tube 28 using an inside-tube-wall radioactive contamination monitoring device configured as described above will be described. First, the heat exchanger tube 28 to be monitored is moved in an arrow direction, that is, in the direction of the radiation detection unit 14 after being placed on the first roller group 31 from the right side of the workbench 29 shown in FIGS. 5 and 6.

On the first roller group 31, for example, runout in the lateral direction of the heat exchanger tube 28 is regulated by the two lateral position regulation guide rollers 41, 42 and further, the coaxial/concentric physical relationship between the heat exchanger tube 28 and the radiation detection unit 14 is maintained by the heat exchanger tube 28 being passed through the longitudinal position regulation guide rollers 33, 34. In this manner, the heat exchanger tube 28 is moved until the stopper 30 is reached so that the radiation detection unit 14 opposite to the workbench in parallel and mechanically protected by the net-like protective tube 19 is inserted into the heat exchanger tube 28.

As a result, if dimensions of the radiation detection unit 14 and the length of the heat exchanger tube to be monitored are as illustrated above with reference to FIG. 1, the radiation detection unit 14 is inserted into the heat exchanger tube 28 until at least half the length of the heat exchanger tube 28 is exceeded. Then, the heat exchanger tube 28 is pulled out and after being rotated by 180°, the process is similarly performed from the opposite side not yet monitored of the heat exchanger tube 28 to monitor the inner surface for radiation. Thus, radiation up to a position exceeding at least half the length of the heat exchanger tube 28 is monitored for in the first monitoring and in the subsequent monitoring, the remaining monitoring exceeding at least half the length is performed. Therefore, monitoring of the heat exchanger tube 28 can be completed without leaving any unmonitored location. In the case of dimensions illustrated above with reference to FIG. 1, about 100 mm in the center in the longitudinal direction of the heat exchanger tube 28 is measured duplicately so that no unmonitored location will arise.

Further, work efficiency can be improved by arranging a plurality of similar monitoring device in positions indicated by alternate short and long dashed lines on the workbench 29 in FIG. 5.

According to the monitoring method described above, contact between a radiation detector and a tube to be monitored is prevented and therefore, damage of the detector can be prevented without loss of measurement performance and also radiation of the inner surface of many tubes can be monitored for precisely and efficiently in a short time.

Figure 8:
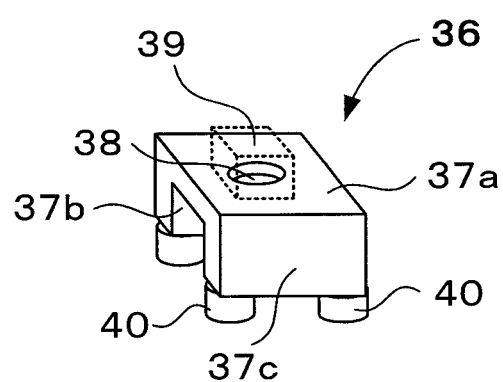
FIG. 8 is a diagram showing an embodiment of a radiation measurement calibration jig shown in FIG. 6.

FIG. 6 shows a radiation measurement calibration jig 36 installed on the workbench 29. The radiation measurement calibration jig 36 is used for calibration of the radiation detection unit 14 to make monitoring reliable. In FIG. 6, the radiation measurement calibration jig 36 is shown together with the heat exchanger tube 28, but this is for the convenience of display and the radiation measurement calibration jig 36 is to be used when the heat exchanger tube 28 is not measured. FIG. 8 shows a diagram showing an embodiment of the radiation measurement calibration jig 36. The radiation measurement calibration jig 36 comprises an upper surface 37a and a pair of side faces 37b, 37c opposite to each other coupled to both ends of the upper surface 37a opposite to each other. The upper surface 37a of the radiation measurement calibration jig 36 is provided with a radiation transmission hole 38 that cuts through the upper surface and allows radiation to pass through and a reference radiation source 39 indicated by a dotted line is placed on the upper surface 37a to cover at least a portion of the radiation transmission hole 38. The radiation detection unit 14 is calibrated by installing the radiation measurement calibration jig 36 as if to straddle the radiation detection unit 14. Incidentally, for example, a level adjustment mechanism 40 as shown in FIG. 8 can be provided at the bottom of the pair of side faces 37b, 37c opposite to each other of the radiation measurement calibration jig 36. Though a concrete configuration is not illustrated in FIG. 8, the level adjustment mechanism 40 can be configured by a hoisting and lowering mechanism using a screw.

Further, work efficiency can be improved by arranging a plurality of similar monitoring devices in positions indicated by alternate short and long dashed lines on the workbench 29 in FIG. 5.

The present invention is not limited to the above embodiment as it is and structural elements thereof may be modified for embodiment in the stage of working without deviating from the spirit thereof. Moreover, various inventions may be formed by suitably combining a plurality of structural elements disclosed in the above embodiment. For example, some structural elements may be removed from all structural elements shown in the embodiment. Further, structural elements across different embodiments may suitably be combined.

REFERENCE SIGNS LIST

10 Mounting plate
11 Inside-tube-wall surface radiation detector
12 Inside-tube-wall radioactive contamination monitor
13 Measuring device
14 Radiation detection unit
15 Photoelectric conversion unit
16 Signal processing unit
17 Handle portion
18 Cable
19 Net-like protective tube
20 Guide portion
21 Light shielding film
22 Light guide bar
23 Scintillator
24 Photoelectric conversion element
25 Transparent acryl light guide
26 Molding resin
27 Radiation transmission hole
28 Heat exchanger tube
29 Workbench
30 Stopper
31 First roller group
32 Second roller group
33, 34 Longitudinal position regulation guide roller
35 Installation member
36 Radiation measurement calibration jig
37a Upper surface of the radiation measurement calibration jig
37b, 37c Side face of the radiation measurement calibration jig
38 Radiation transmission hole
39 Reference radiation source
40 Level adjustment mechanism
41, 42 Lateral position regulation guide roller
43, 44 Elastic member

The invention claimed is:

1. An inside-tube-wall radioactive contamination monitor to monitor for radioactive contamination of an inner surface of a tube, comprising:
    a rod-like light guide bar whose section is polygonal;
    a plurality of scintillators mounted on an outer circumference of the rod-like light guide bar;
    a net-like protective tube attached to cover an outer circumference of the plurality of scintillators with a space to a surface of the scintillators;
    a guide portion in a shape in which a diameter decreases with a decreasing distance to a tip of the guide portion, the guide portion being attached to a tip portion of the net-like protective tube and supporting a tip portion of the rod-like light guide bar;
    a photoelectric conversion unit coupled to a base end of the net-like protective tube and containing a photoelectric conversion element; and
    a signal processing unit connected to the photoelectric conversion unit.

2. The inside-tube-wall radioactive contamination monitor according to claim 1, wherein a light shielding film that allows radiation to pass through, but blocks light is arranged on the inner surface of the net-like protective tube.

3. The inside-tube-wall radioactive contamination monitor according to claim 2, wherein the net-like protective tube is formed of stainless steel.

4. The inside-tube-wall radioactive contamination monitor according to claim 3, wherein a plurality of radiation transmission holes in a parallel hexagonal shape in which one pair of opposite sides whose length is longer than other sides is formed reticulately in the net-like protective tube, and
    the radiation transmission holes in the parallel hexagonal shape are arranged in such a way that sides whose length is longer than the other sides are parallel to an axis in a longitudinal direction of the net-like protective tube.

5. The inside-tube-wall radioactive contamination monitor according to claim 4, wherein the net-like protective tube has an opening ratio of 85%.

6. The inside-tube-wall radioactive contamination monitor according to claim 5, wherein the net-like protective tube is detachably mounted on a cabinet of the photoelectric conversion unit.

7. The inside-tube-wall radioactive contamination monitor according to claim 6, wherein the photoelectric conversion element is fixed by molding resin injected into the cabinet of the photoelectric conversion unit and cured.

8. An inside-tube-wall radioactive contamination monitoring device to monitor for radioactive contamination of inner surface of a tube by using the inside-tube-wall radioactive contamination monitor according to any one of claims 1 to 7, comprising:
- a workbench;
- the inside-tube-wall radioactive contamination monitor fixed onto the workbench;
- a first roller group comprising a plurality of rollers arranged on the workbench along an axis of a radiation detection unit constituting the inside-tube-wall radioactive contamination monitor in such a way that rotation axes thereof are parallel to each other to transport the tube to be monitored;
- a second roller group comprising a plurality of rollers arranged on the workbench between the first roller group and the radiation detection unit along the axis of the radiation detection unit in such a way that the rotation axes thereof are parallel to each other to transport the tube to be monitored;
- at least a pair of longitudinal position regulation guide rollers provided on the workbench between the first roller group and the second roller group to regulate a position in a longitudinal direction of the transported tube to be monitored; and
- a plurality of lateral position regulation guide rollers arranged in the first roller group or the second roller group to regulate the position in a lateral direction of the transported tube to be monitored.

9. The inside-tube-wall radioactive contamination monitoring device according to claim 8, wherein at least the one pair of the longitudinal position regulation guide rollers and the plurality of lateral position regulation guide rollers have an hourglass shape in which a center portion thereof is contracted,
the longitudinal position regulation guide rollers are installed upright on an installation member provided on the workbench, and
the installation member is provided with elastic members as if to sandwich the tube to be monitored while being transported between the pair longitudinal position regulation guide rollers.

10. The inside-tube-wall radioactive contamination monitoring device according to claim 9, wherein a stopper to stop movement of the transported tube to be monitored is provided on the workbench between the photoelectric conversion unit and the second roller group.

11. The inside-tube-wall radioactive contamination monitoring device according to claim 10, wherein when the radiation detection unit constituting the inside-tube-wall radioactive contamination monitor is calibrated, a radiation measurement calibration jig to place a radiation source above the radiation detection unit is installed on the workbench, and
the radiation transmission holes through which radiation from the radiation source passes are formed in an upper surface of the radiation measurement calibration jig.

12. An inside-tube-wall radioactive contamination monitoring method of monitoring for radioactive contamination of an inner surface of a tube by using the inside-tube-wall radioactive contamination monitoring device according to claim 8, comprising:
- placing the tube to be monitored on the first roller group;
- moving the tube to be monitored on the first roller group while being placed on the first roller group;
- regulating a positional shift in the lateral direction of the tube to be monitored by the plurality of lateral position regulation guide rollers;
- moving the tube to be monitored forward between at least the one pair of longitudinal position regulation guide rollers against the elastic members;
- regulating the positional shift in the longitudinal direction of the tube to be monitored;
- moving the tube to be monitored forward so that the radiation detection unit is inserted into the tube to be monitored while being placed on the second roller group; and
- monitoring the inner surface of the tube to be monitored for radioactive contamination.

13. An inside-tube-wall radioactive contamination monitoring method, comprising:
- pulling out the tube to be monitored whose monitoring of the radioactive contamination is completed from the radiation detection unit;
- reversing a position in an axial direction of the tube to be monitored; and
- monitoring the inner surface of the tube to be monitored whose position has been reversed for the radioactive contamination by the method according to claim 12.

* * * * *